(12) United States Patent
Esseghir et al.

(10) Patent No.: US 9,272,469 B2
(45) Date of Patent: Mar. 1, 2016

(54) CROSSLINKED, MELT-SHAPED ARTICLES AND COMPOSITIONS FOR PRODUCING SAME

(71) Applicant: Union Carbide Chemicals & Plastics Technology LLC, Midland, MI (US)

(72) Inventors: Mohamed Esseghir, Monroe Township, NJ (US); Jeffrey M. Cogen, Flemington, NJ (US); Saurav S. Sengupta, Franklin Park, NJ (US)

(73) Assignee: Union Carbide Chemicals & Plastics Technology LLC, Midland, MI (US)

(*) Notice: Subject to any disclaimer, the term of this patent is extended or adjusted under 35 U.S.C. 154(b) by 0 days.

(21) Appl. No.: 14/192,319

(22) Filed: Feb. 27, 2014

(65) Prior Publication Data

US 2014/0193628 A1    Jul. 10, 2014

Related U.S. Application Data

(62) Division of application No. 13/496,430, filed as application No. PCT/US2010/048727 on Sep. 14, 2010.

(60) Provisional application No. 61/242,857, filed on Sep. 16, 2009.

(51) Int. Cl.
*H01B 3/22* (2006.01)
*H01B 3/30* (2006.01)
(Continued)

(52) U.S. Cl.
CPC .............. *B29C 67/24* (2013.01); *B29C 45/0001* (2013.01); *B29C 45/16* (2013.01); *B29C 70/88* (2013.01); *C08J 3/24* (2013.01); *C08J 3/244* (2013.01); *C08J 3/246* (2013.01); *C08L 23/04* (2013.01); *C08L 51/06* (2013.01); *C08L 83/04* (2013.01); *C08L 83/06* (2013.01); *H01B 3/22* (2013.01); *H01B 3/307* (2013.01); *H01B 3/46* (2013.01); *H01B 7/00* (2013.01);
(Continued)

(58) Field of Classification Search
CPC .................................................. C08L 2207/332
See application file for complete search history.

(56) References Cited

U.S. PATENT DOCUMENTS 3,646,155 A    2/1972   George et al.
4,029,830 A *  6/1977   Yamamoto et al. ........... 427/487
(Continued)

FOREIGN PATENT DOCUMENTS

EP    1018533      7/2000
JP    62-143958 A  6/1987
(Continued)

OTHER PUBLICATIONS

Partial Written Translation of JP 2640129B. Aug. 13, 1997.*
(Continued)

*Primary Examiner* — Robert C Boyle
*Assistant Examiner* — Stephen Rieth
(74) *Attorney, Agent, or Firm* — Whyte Hirschboeck Dudek S.C.

(57) ABSTRACT

Disclosed is a crosslinkable mixture comprising a polyolefin, an alkoxysilane, an organopolysiloxane, a free radical initiator and a liquid polymer modifier. The organopolysiloxane contains two or more hydroxyl end groups. When the crosslinkable mixture is melt-shaped, a unique crosslinked composition is formed. The liquid polymer modifier improves flexibility of the melt-shaped article without decreasing dielectric strength.

13 Claims, 4 Drawing Sheets

(51) Int. Cl.
*H01B 3/46* (2006.01)
*C08L 23/08* (2006.01)
*C08L 83/06* (2006.01)
*B29C 67/24* (2006.01)
*C08J 3/24* (2006.01)
*C08L 23/04* (2006.01)
*C08L 83/04* (2006.01)
*H01B 7/00* (2006.01)
*C08L 51/06* (2006.01)
*B29C 45/00* (2006.01)
*B29C 45/16* (2006.01)
*B29C 70/88* (2006.01)
*H01B 19/00* (2006.01)
*C08G 77/16* (2006.01)
*C08G 77/442* (2006.01)
*B29K 23/00* (2006.01)
*B29K 105/00* (2006.01)
*B29K 105/24* (2006.01)
*B29L 9/00* (2006.01)
*B29L 31/34* (2006.01)

(52) U.S. Cl.
CPC ............ *H01B 19/00* (2013.01); *B29K 2023/06* (2013.01); *B29K 2023/0625* (2013.01); *B29K 2023/18* (2013.01); *B29K 2105/0014* (2013.01); *B29K 2105/0067* (2013.01); *B29K 2105/0085* (2013.01); *B29K 2105/0088* (2013.01); *B29K 2105/24* (2013.01); *B29K 2995/0083* (2013.01); *B29K 2995/0097* (2013.01); *B29L 2009/00* (2013.01); *B29L 2031/3462* (2013.01); *C08G 77/16* (2013.01); *C08G 77/442* (2013.01); *C08J 2383/04* (2013.01); *C08J 2423/04* (2013.01); *C08L 2203/202* (2013.01); *C08L 2207/322* (2013.01)

(56) References Cited

U.S. PATENT DOCUMENTS

| | | | |
|---|---|---|---|
| 4,144,202 A | | 3/1979 | Ashcraft et al. |
| 4,806,594 A | * | 2/1989 | Gross et al. ............ 525/64 |
| 5,064,802 A | | 11/1991 | Stevens et al. |
| 5,169,900 A | | 12/1992 | Gudelis |
| 5,246,783 A | | 9/1993 | Spenadel et al. |
| 5,272,236 A | | 12/1993 | Lai et al. |
| 5,278,272 A | | 1/1994 | Lai et al. |
| 5,986,028 A | | 11/1999 | Lai et al. |
| 6,048,935 A | | 4/2000 | Penfold et al. |
| 6,465,107 B1 | | 10/2002 | Kelly |
| 6,496,629 B2 | | 12/2002 | Ma et al. |
| 6,714,707 B2 | | 3/2004 | Rossi et al. |
| 2006/0173123 A1 | | 8/2006 | Yang et al. |

FOREIGN PATENT DOCUMENTS

| | | |
|---|---|---|
| JP | 2640129 B2 | 8/1997 |
| WO | 9319104 | 9/1993 |
| WO | 9500526 | 1/1995 |
| WO | 9514024 | 5/1995 |
| WO | 9810724 | 3/1998 |
| WO | 9849212 | 11/1998 |

OTHER PUBLICATIONS

Written Translation of JP62-143958A. Jun. 27, 1987.*
Krigas, T. M., Carella, J. M., Struglinkski, M. J., Crist, B., and Graessley, W. W. Model Copolymers of Ethylene and Butene-1 Made by Hydrogenation of Polybutadiene: Chemical Composition and Selected Physical Properties. Journal of Polymer Science: Polymer Physics Edition, vol. 23, 1985, pp. 509-520.*
Definition of accessory. http://dictionary.reference.com/browse/accessories. As viewed on Mar. 17, 2015.*
FAQ: What does 'Shore Hardness' mean? Smooth-On website, http://www.smooth-on.com/faq_display.php?faq_id=75. As viewed on Jul. 15, 2015.*
Jackson, A. Synthetic versus Mineral Fluids in Lubrication. International Tribology Conference. Melbourne, Australia. Dec. 2-4, 1987.*
Machine Translation of JP 2640129 B2, Aug. 13, 1997.
Yussuf, A.A., "Silane grafting and crosslinking of metallocene-catalysed LLDPE and LDPE", Malaysian Polymer Journal, vol. 2, No. 2, p. 58-71, 2007.
Mori, et al., "Flame-resistant crosslinked polyolefin foam-insulated wire production method", Chemical Abstracts Service, Columbus, Ohio, US, Jun. 12, 1997.

* cited by examiner

CROSSLINKED, MELT-SHAPED ARTICLES AND COMPOSITIONS FOR PRODUCING SAME

PRIORITY

This application is a Divisional of U.S. patent application Ser. No. 13/496,430, filed on Mar. 15, 2012; which claims priority to International Application No. PCT/US2010/048727 filed on Sep. 14, 2010; which claims priority to U.S. Patent Application No. 61/242,857 filed on Sep. 16, 2009, the entire content of which is incorporated by reference herein.

FIELD

This disclosure relates to crosslinked, melt-shaped articles. In one aspect, the disclosure relates to a process for producing crosslinked, melt-shaped articles while in another aspect, the disclosure relates to such a process in which the articles are crosslinked using a organopolysiloxane containing two or more functional end groups. In yet another aspect, the disclosure relates to such a process in which the crosslinking is accomplished without requiring the use of post-shaping external heat or moisture.

BACKGROUND

Compositions used in the manufacture of crosslinkable articles, such as heat resistant wire and cable coatings and molded parts and accessories, typically require cross-linking after final shaping. Various crosslinking methods are practiced in the art, two of which are in wide usage, i.e., peroxide crosslinking and moisture cure (the latter of which usually employs a silane grafted or copolymerized polyolefin).

Moisture cure systems have the advantage in that they can be processed within a wide range of melt temperatures but are generally limited to thin wall constructions because the crosslinking relies on diffusion of external moisture into the article. Peroxide cure compositions are preferred for thick wall constructions, e.g. medium voltage (MV) cable insulation and molded cable accessories. These curable compounds need to be processed at temperatures which are below the peroxide decomposition temperature in order to avoid premature crosslinking (scorch) prior to forming the article. Once the article is formed, it needs to be heated uniformly to the peroxide decomposition temperature, and then held at that temperature for the time necessary to achieve the desired level of crosslinking. This can keep the production rate for such articles low due to poor heat transfer through the article walls. Furthermore, once the article is cooled, peroxide decomposition slows down to negligible levels; thus any significant crosslinking comes to an end. The combined problems of scorch and long heating and cure times (whether in-mold cure time or residence time in a continuous vulcanization tube) lead to long manufacturing cycles, and thus low productivity (units per time).

Flexibility is desired in crosslinked polyolefin articles, particularly in wire and cable applications. Flexibility in wire and cable coating promotes proper cable reeling as well as handling during cable joining. Flexibility in wire & cable accessories promotes ease of installation over a broad range of cable sizes.

Known are oil extender additives for improving flexibility to crosslinked articles. Addition of oil extender to crosslinked articles, however, has its drawbacks. In particular, addition of oil extender results in a decrease in dielectric strength (ACBD) for the crosslinked article.

A need exists for flexible crosslinked polyolefin articles with high dielectric strength. A need further exists for flexible crosslinked polyolefin articles for wire and cable applications.

SUMMARY

The present disclosure is directed to crosslinked polyolefin articles with improved flexibility and high dielectric strength. The present crosslinked articles include a crosslinked polyolefin and a liquid polymer modifier. The polyolefin is crosslinked by way of a unique silane linkage. The liquid polymer modifier improves flexibility without negatively effecting dielectric strength.

The present disclosure provides a crosslinkable mixture which includes a polyolefin, an alkoxysilane, an organopolysiloxane, a free radical initiator, and a liquid polymer modifier. The organopolysiloxane contains two or more hydroxyl end groups. In an embodiment, the crosslinkable mixture contains a crosslinking catalyst.

The present disclosure provides another crosslinkable mixture which includes a silane-grafted polyethylene, an organopolysiloxane; and a liquid polymer modifier. The organopolysiloxane contains two or more hydroxyl end groups. In an embodiment, the crosslinkable mixture contains a crosslinking catalyst.

The present disclosure provides a melt-shaped article which includes a crosslinked polyethylene composition, an organopolysiloxane, and a liquid polymer modifier. The organopolysiloxane contains two or more hydroxyl end groups.

In an embodiment, the melt-shaped article includes polysiloxane linkages between the polymer chains of the polyethylene, the polysiloxane linkages having the structure (I)

wherein n=1 to 100,000.

DETAILED DESCRIPTION

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the composition and various process parameters.

"Ambient conditions" and like terms means temperature, pressure and humidity of the surrounding area or environment of an article. The ambient conditions of a typical office building or laboratory include a temperature of 23° C. and atmospheric pressure.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

"Catalytic amount" means an amount of catalyst necessary to promote the crosslinking of an ethylene-vinylsilane polymer at a detectable level, preferably at a commercially acceptable level.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricants, fillers, anti-oxidants and the like.

"Crosslinked," "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content). A "crosslinkable mixture," as used herein, is a polymeric mixture that, when subjected to melt shaping, forms a link (i.e., a crosslink) between at least two individual polymer chains of the polymer.

"Ethylene polymer", "polyethylene" and like terms mean a polymer containing units derived from ethylene. Ethylene polymers typically comprise at least 50 mole percent (mol %) units derived from ethylene.

"Ethylene-vinylsilane polymer" and like terms mean an ethylene polymer comprising silane functionality. The silane functionality can be the result of either polymerizing ethylene with a vinyl silane, e.g., a vinyl trialkoxy silane comonomer, or, grafting such a comonomer onto an ethylene polymer backbone as described, for example, in U.S. Pat. No. 3,646,155 or 6,048,935.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Melt-shaped" and like terms refer to an article made from a thermoplastic composition that has acquired a configuration as a result of processing in a mold or through a die while in a melted state. The melt-shaped article may be at least partially crosslinked to maintain the integrity of its configuration. Melt-shaped articles include wire and cable sheaths, compression and injection molded parts, sheets, tapes, ribbons and the like.

"Polymer" means a compound prepared by reacting (i.e., polymerizing) monomers, whether of the same or a different type. The generic term polymer thus embraces the term "homopolymer", usually employed to refer to polymers prepared from only one type of monomer, and the term "interpolymer" as defined below.

"Propylene polymer," "polypropylene" and like terms mean a propylene polymer containing units derives from propylene. Propylene polymer typically comprise at least 50 mole percent (mol %) units derived from propylene.

The present disclosure provides a crosslinkable mixture. The crosslinkable mixture includes a polyolefin, an alkoxysilane, an organopolysiloxane, and a liquid polymer modifier. The organopolysiloxane contains two or more hydroxyl end groups. The crosslinkable mixture may optionally include a free radical initiator and/or a crosslinking catalyst.

The polyolefin may be one or more $C_2$-$C_{12}$ polyolefin and combinations thereof. Nonlimiting examples of suitable polyolefins include one or more propylene polymers, one or more ethylene polymers, and any combination thereof.

Ethylene Polymers

In an embodiment, the polyolefin is a polyethylene. The polyethylenes used in the practice of this disclosure for grafting silane, i.e., the polyethylenes that are subsequently grafted with a silane, can be produced using conventional polyethylene polymerization technology, e.g., high-pressure, Ziegler-Natta, metallocene or constrained geometry catalysis. In one embodiment, the polyethylene is made using a mono- or bis-cyclopentadienyl, indenyl, or fluorenyl transition metal (preferably Group 4) catalysts or constrained geometry catalysts (CGC) in combination with an activator, in a solution, slurry, or gas phase polymerization process. The catalyst is preferably mono-cyclopentadienyl, mono-indenyl or mono-fluorenyl CGC. The solution process is preferred. U.S. Pat. No. 5,064,802, WO93/19104 and WO95/00526 disclose constrained geometry metal complexes and methods for their preparation. Variously substituted indenyl containing metal complexes are taught in WO95/14024 and WO98/49212.

In general, polymerization can be accomplished at conditions well-known in the art for Ziegler-Natta or Kaminsky-Sinn type polymerization reactions, that is, at temperatures from 0-250° C., preferably 30-200° C., and pressures from atmospheric to 10,000 atmospheres (1013 megaPascal (MPa)). Suspension, solution, slurry, gas phase, solid state powder polymerization or other process conditions may be employed if desired. The catalyst can be supported or unsupported, and the composition of the support can vary widely. Silica, alumina or a polymer (especially poly(tetrafluoroethylene) or a polyolefin) are representative supports, and desirably a support is employed when the catalyst is used in a gas phase polymerization process. The support is preferably employed in an amount sufficient to provide a weight ratio of catalyst (based on metal) to support within a range of from 1:100,000 to 1:10, more preferably from 1:50,000 to 1:20, and most preferably from 1:10,000 to 1:30. In most polymerization reactions, the molar ratio of catalyst to polymerizable compounds employed is from $10^{-12}$:1 to $10^{-1}$:1, more preferably from $10^{-9}$:1 to $10^{-5}$:1.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene.

The ethylene polymers useful in the practice of this disclosure include ethylene/α-olefin interpolymers having an α-olefin content of between about 15, preferably at least about 20 and even more preferably at least about 25, wt % based on the weight of the interpolymer. These interpolymers typically have an α-olefin content of less than about 50, preferably less than about 45, more preferably less than about 40 and even more preferably less than about 35, wt % based on the weight of the interpolymer. The α-olefin content is measured by $^{13}$C nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer, and this translates into desirable physical and chemical properties for the protective insulation layer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Illustrative ethylene polymers include ethylene/propylene, ethylene/butene, ethylene/1-hexene, ethylene/1-octene, ethylene/styrene, and the like. Illustrative terpolymers include ethylene/propylene/1-octene, ethylene/propylene/butene, ethylene/butene/1-octene, ethylene/propylene/diene monomer (EPDM) and ethylene/butene/styrene. The copolymers can be random or blocky.

The ethylene polymers used in the practice of this disclosure can be used alone or in combination with one or more other ethylene polymers, e.g., a blend of two or more ethylene polymers that are "different from one another," which means the ethylene polymers are uncommon by way of at least one property such as: monomer/comonomer composition and content, melt index, melt temperature, degree of branching, catalytic method of preparation, etc. If the ethylene polymer is a blend of two or more ethylene polymers, then the ethylene polymer can be blended by any in-reactor or post-reactor process. The in-reactor blending processes are preferred to the post-reactor blending processes, and the processes using multiple reactors connected in series are the preferred in-reactor blending processes. These reactors can be charged with the same catalyst but operated at different conditions, e.g., different reactant concentrations, temperatures, pressures, etc, or operated at the same conditions but charged with different catalysts.

Examples of ethylene polymers made with high pressure processes include (but are not limited to) low density polyethylene (LDPE), ethylene silane reactor copolymer (such as SiLINK® made by The Dow Chemical Company), ethylene vinyl acetate copolymer (EVA), ethylene ethyl acrylate copolymer (EEA), and ethylene silane acrylate terpolymers.

Other examples of ethylene polymers that can be grafted with silane functionality include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). The more preferred ethylene polymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

In an embodiment, the crosslinkable mixture includes a first polyethylene and a second polyethylene that is different than the first polyethylene. The first polyethylene has at least one uncommon (not the same) property or structure when compared to the second polyethylene. The polyethylene that is copolymerized with silane functionality is made using a high pressure process.

Silane Functionality

In the case where the polyolefin is grafted with silane, the crosslinkable mixture includes an alkoxysilane. Any alkoxysilane that will effectively copolymerize with ethylene, or graft to and crosslink an ethylene polymer, can be used in the practice of this disclosure, and those described by the following formula are exemplary:

wherein $R^1$ is a hydrogen atom or methyl group; x and y are 0 or 1 with the proviso that when x is 1, y is 1; m and n are independently an integer from 0 to 12 inclusive, preferably 0 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R groups is an alkyl. Such alkoxysilane may be copolymerized with ethylene in a reactor, such as a high pressure process. Such alkoxysilane may also be grafted to a suitable ethylene polymer by the use of a suitable quantity of organic peroxide, either before or during a shaping or molding operation. Additional ingredients such as heat and light stabilizers, pigments, scorch retardants etc., also may be included in the formulation. The phase of the process during which the crosslinks are created is commonly referred to as the "cure phase" and the process itself is commonly referred to as "curing". Also included is alkoxysilane that adds to unsaturation in the polymer via free radical processes such as mercaptopropyl trialkoxysilane.

Suitable alkoxysilanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred alkoxysilanes are the unsaturated alkoxy silanes which can be grafted onto the polymer or copolymerized in-reactor with other monomers (such as ethylene and acrylates). These alkoxysilanes and their method of preparation are more fully described in U.S. Pat. No. 5,266,627 to Meverden, et al. Vinyl trimethoxy silane (VTMS), vinyl triethoxy silane, vinyl triacetoxy silane, gamma-(meth)acryloxy propyl trimethoxy silane and mixtures of these silanes are the preferred silane crosslinkers for use in this disclosure.

The amount of alkoxysilane crosslinker used in the practice of this disclosure can vary widely depending upon the nature of the polymer, the alkoxysilane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of alkoxysilane crosslinker used in the practice of this disclosure, and typically the maximum amount of alkoxysilane crosslinker does not exceed 5, preferably it does not exceed 3, weight percent.

The alkoxysilane crosslinker is grafted to the polymer by any conventional method, typically in the presence of a free radical initiator, e.g. peroxides or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. The amount of initiator can vary, but it is typically present in an amount of at least 0.01, preferably at least 0.06, parts per hundred resin (wt. %). Typically, the initiator does not exceed 0.15, preferably it does not exceed about 0.10, wt. %. The weight ratio of silane crosslinker to initiator also can vary widely, but the typical crosslinker:initiator weight ratio is between 10:1 to 500:1, preferably between 18:1 and 250:1. As used in parts per hundred resin or phr, "resin" means the olefinic polymer.

While any conventional method can be used to graft the alkoxysilane crosslinker to the polyolefin polymer, one preferred method is blending the two with the initiator in the first stage of a reactive extrusion or mixing process, such as a Buss kneader or a twin-screw extruder. The grafting conditions can vary, but the melt temperatures are typically between 160 and 260° C., preferably between 190 and 230° C., depending upon the residence time and the half life of the initiator.

Copolymerization of vinyl trialkoxysilane crosslinkers with ethylene and other monomers may be done in a high-pressure reactor that is used in the manufacture of ethylene homopolymers and copolymers with vinyl acetate and acrylates.

Polyfunctional Organopolysiloxane with Functional End Groups

The crosslinkable mixture includes an organopolysiloxane, such as a polyfunctional organopolysiloxane with two or more functional end groups. The oligomers containing functional end groups useful in the present process comprise from 2 to 100,000 or more units of the formula $R_2SiO$ in which each R is independently selected from a group consisting of alkyl radicals comprising one to 12 carbon atoms, alkenyl radicals comprising two to about 12 carbon atoms, aryls, and fluorine substituted alkyl radicals comprising one to about 12 carbon atoms. The radical R can be, for example, methyl, ethyl, n-propyl, isopropyl, n-butyl, sec-butyl, dodecyl, vinyl, allyl, phenyl, naphthyl, tolyl, and 3,3,3-trifluoropropyl. Preferred is when each radical R is methyl.

In one embodiment, the organopolysiloxane contains two or more hydroxyl end groups such as a hydroxyl-terminated polydimethylsiloxane containing at least two hydroxyl end groups. Such polydimethylsiloxanes are commercially available, for example as silanol-terminated polydimethylsiloxane from Gelest, Inc. However, polydimethylsiloxanes having other terminal groups that can react with grafted silanes may be used e.g. polydimethylsiloxanes with amine end groups and the like. In preferred embodiments, the polydimethylsiloxane is of the formula in which Me is methyl and n is in the range of 1 to 100,000 or more. The value "n" can have a lower limit of 1, or 2, or, 3, or, 4, or 5, or, 10, or 15, or 20 and an upper limit of 50, or 75, or, 100, or, 120, or 400, or 1000, or 100,000. Nonlimiting examples of suitable polyfunctional organopolysiloxanes are the silanol-terminated polydimethylsiloxane DMS-15 (Mn of 2,000-3,500, viscosity of 45-85 centistokes, —OH level of 0.9-1.2%) from Gelest Corp., and Silanol Fluid Q1-3563 (viscosity 55-90 centistokes, —OH level of 1-1.7%) from Dow Corning Corp. In some embodiments the polyfunctional organopolysiloxane comprises branches such as those imparted by Me-SiO$_{3/2}$ or SiO$_{4/2}$ groups (known as T or Q groups to those skilled in silicone chemistry).

The amount of polyfunctional organopolysiloxane used in the practice of this disclosure can vary widely depending upon the nature of the polymer, the alkoxysilane, the polyfunctional organopolysiloxane, the processing or reactor conditions, the ultimate application, and similar factors, but typically at least 0.5, preferably at least 2, weight percent is used. Considerations of convenience, polymer acceptance and economy are some of the principal limitations on the maximum amount of polyfunctional organopolysiloxane used in the practice of this disclosure, and typically the maximum amount of polyfunctional organopolysiloxane does not exceed 20, preferably it does not exceed 10, weight percent.

Crosslinking Catalyst

The crosslinkable mixture optionally includes a crosslinking catalyst. Crosslinking catalysts include the Lewis and Brønsted acids and bases. Lewis acids are chemical species that can accept an electron pair from a Lewis base. Lewis bases are chemical species that can donate an electron pair to a Lewis acid. Lewis acids that can be used in the practice of this disclosure include the tin carboxylates such as dibutyl tin dilaurate (DBTDL), dimethyl hydroxy tin oleate, dioctyl tin maleate, di-n-butyl tin maleate, dibutyl tin diacetate, dibutyl tin dioctoate, stannous acetate, stannous octoate, and various other organo-metal compounds such as lead naphthenate, zinc caprylate and cobalt naphthenate. DBTDL is a preferred Lewis acid. Lewis bases that can be used in the practice of this disclosure include, but are not limited to, the primary, secondary and tertiary amines. These catalysts are typically used in moisture cure applications.

Brønsted acids are chemical species that can lose or donate a hydrogen ion (proton) to a Brønsted base. Brønsted bases are chemical species that can gain or accept a hydrogen ion from a Brønsted acid. Brønsted acids that can be used in the practice of this disclosure include sulfonic acid.

The minimum amount of crosslinking catalyst used in the practice of this disclosure is a catalytic amount. Typically this amount is at least 0.01, preferably at least 0.02 and more preferably at least 0.03, weight percent (wt %) of the combined weight of ethylene-vinylsilane polymer and catalyst. The only limit on the maximum amount of crosslinking catalyst in the ethylene polymer is that imposed by economics and practicality (e.g., diminishing returns), but typically a general maximum comprises less than 5, preferably less than 3 and more preferably less than 2, wt % of the combined weight of ethylene polymer and condensation catalyst.

Liquid Polymer Modifier

The crosslinkable mixture includes a liquid polymer modifier. A "liquid polymer modifier," as used herein, is a nonfunctionalized plasticizer (NFP). As used herein, an "NFP" is a hydrocarbon liquid, which does not include to an appreciable extent functional groups selected from hydroxide, aryls and substituted aryls, halogens, alkoxys, carboxylates, esters, carbon unsaturation, acrylates, oxygen, nitrogen, and carboxyl. By "appreciable extent," it is meant that these groups and compounds comprising these groups are not deliberately added to the NFP, and if present at all, are present in embodiments at less than 5 percent by weight of the NFP, or less than 4, 3, 2, 1, 0.7, 0.5, 0.3, 0.1, 0.05, 0.01, or 0.001 wt %, based upon the weight of the NFP.

In an embodiment, aromatic moieties (including any compound whose molecules have the ring structure characteristic of benzene, naphthalene, phenanthrene, anthracene, etc.) are substantially absent from the NFP. In another embodiment, naphthenic moieties (including any compound whose molecules have a saturated ring structure such as would be produced by hydrogenating benzene, naphthalene, phenanthrene, anthracene, etc.) are substantially absent from the NFP. By "substantially absent," it is meant that these compounds are not added deliberately to the compositions and if present at all, are present at less than 0.5 wt %, preferably less than 0.1 wt % by weight of the NFP.

In another embodiment, the NFP does not contain olefinic unsaturation to an appreciable extent. By "appreciable extent of olefinic unsaturation" it is meant that the carbons involved in olefinic bonds account for less than 10% of the total number of carbons in the NFP, preferably less than 8%, 6%, 4%, 2%, 1%, 0.7%, 0.5%, 0.3%, 0.1%, 0.05%, 0.01%, or 0.001%. In some embodiments, the percent of carbons of the NFP involved in olefinic bonds is between 0.001 and 10% of the total number of carbon atoms in the NFP, preferably between 0.01 and 5%, preferably between 0.1 and 2%, more preferably between 0.1 and 1%.

In an embodiment, the liquid polymer modifier is an NFP that is a phthalate-free hydrogenated $C_8$ to $C_{12}$ poly-alpha-olefin. The phthalate-free hydrogenated $C_8$ to $C_{12}$ poly-alpha-olefin is naturally inert and does not affect the cure chemistry of the crosslinkable mixture as do conventional modifiers like mineral oil, white oil and paraffinic oils. Similarly, the present liquid polymer modifier does not affect other chemistries, such as, for example, antioxidant chemistry, filler chemistry, adhesion chemistry or the like.

In addition, the present liquid polymer modifier has high permanence, good compatibility with polyethylenes and ethylene copolymers, and narrow molecular weight distribution (Mw/Mn or MWD). As a result, applications using the present liquid polymer modifier have a surprising combination of desired properties including high cure efficiency, improved flexibility and toughness and easy processing. Such applications display excellent surface properties and exceptional retention of properties over time.

A nonlimiting example of a suitable liquid polymer modifier is polymer modifier sold under the tradename Elevast, such as Elevast R-150. Elevast polymer modifier is available from the ExxonMobil Chemical Company, Houston, Tex.

The liquid polymer modifier advantageously replaces oil extenders (paraffin oil and/or mineral oil) in the crosslinked, melt-shaped article. When compared to the same crosslinked, melt-shaped article with oil extender; a crosslinked, melt-shaped article containing the present liquid polymer modifier unexpectedly exhibits improved softness (i.e., lower Shore A Hardness value), increased flexibility, (i.e., increase in M100), greater elongation, enhanced elasticity, and improved processability (lower viscosity)—all with no decrease in dielectric strength of the crosslinked, melt-shaped article. The foregoing physical improvements from the liquid polymer modifier are surprising and unexpected in view of conventional oil extenders because oil extenders decrease dielectric strength in the resultant crosslinked product. Nonlimiting applications of crosslinked, melt-shaped article containing the present liquid polymer modifier and exhibiting the foregoing physical improvements (without loss of dielectric strength) include wire and cable, and other applications where good dielectric properties are required.

The liquid polymer modifier may be added during different steps of the production process. In an embodiment, the liquid polymer modifier is added to a crosslinkable mixture composed of (1) organopolysiloxane (with two or more hydroxyl end groups) and (2) a silane-grafted or silane-copolymerized polyolefin. This crosslinkable mixture is subsequently melt-shaped, partially crosslinked, cooled, and further crosslinked upon exposure to ambient conditions.

In an embodiment, the liquid polymer modifier is added to a crosslinkable mixture composed of (1) organopolysiloxane containing two or more hydroxyl end groups, (2) polyolefin, (3) silane, and (4) peroxide. The crosslinkable mixture is subsequently melt-shaped, partially crosslinked, cooled and further crosslinked when exposed to ambient conditions.

In an embodiment, the liquid polymer modifier is added with the crosslinking catalyst. A silane-grafted polyolefin is prepared to which a hydroxyl-terminated polydimethylsiloxane is added. The mixture is melt-shaped into a storage article. The storage article is introduced into a second melt-shaping operation wherein the storage article is melt-shaped into a finished article. The process includes introducing the crosslinking catalyst and the liquid polymer modifier during or after the second melt-shaping operation. The process further includes cooling and crosslinking the finished article from the second melt-shaping operation.

Fillers and Additives

The composition from which the crosslinked article, e.g., cable insulation layer or protective jacket, injection molded elastomeric connector, etc., or other article of manufacture, e.g., seal, gasket, shoe sole, etc., is made can be filled or unfilled. If filled, then the amount of filler present should preferably not exceed an amount that would cause unacceptably large degradation of the electrical and/or mechanical properties of the crosslinked composition. Typically, the amount of filler present is between 2 and 80, preferably between 5 and 70, weight percent (wt %) based on the weight of the polymer. Representative fillers include kaolin clay, magnesium hydroxide, silica, calcium carbonate and carbon blacks. The filler may or may not have flame retardant properties. In a preferred embodiment of this disclosure in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this disclosure can also contain additives such as, for example, antioxidants (e.g., hindered phenols such as, for example, IRGANOX™ 1010 a registered trademark of Ciba Specialty Chemicals), phosphites (e.g., IRGAFOS™ 168 a registered trademark of Ciba Specialty Chemicals), UV stabilizers, cling additives, light stabilizers (such as hindered amines), plasticizers (such as dioctylphthalate or epoxidized soy bean oil), scorch inhibitors, mold release agents, tackifiers (such as hydrocarbon tackifiers), waxes (such as polyethylene waxes), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present disclosure. These additives are used in amounts known to those versed in the art.

The crosslinkable mixture may comprise two or more embodiments disclosed herein.

Compounding/Fabrication

Compounding of the polyolefin, alkoxysilane, polyfunctional organopolysiloxane, liquid polymer modifier, free radical initiator, optional crosslinking catalyst, optional filler and optional additives, if any, can be performed by standard means known to those skilled in the art. Examples of compounding equipment are internal batch mixers, such as a Banbury or Bolling internal mixer. Alternatively, continuous single or twin screw mixers can be used, such as a Farrel continuous mixer, a Werner and Pfleiderer twin screw mixer, or a Buss kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The crosslinking catalyst is typically added via an additive masterbatch to ethylene-vinylsilane copolymer or grafted silane polyolefin prior to shaping the article. Typically, the components are mixed together in a melt-mixing device. The mixture is then shaped into an article. The temperature of compounding and article fabrication should be above the melting point of the ethylene-vinylsilane copolymer or grafted silane polyolefin but below about 250° C.

In some embodiments, either or both of the crosslinking catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler. In one embodiment, crosslinkable silicone-modified polyolefin mixtures are prepared in the absence of a crosslinking catalyst for extended shelf life, and the crosslinking catalyst is added as a final step in the preparation of a melt-shaped article.

In one embodiment the disclosure is a process for the manufacture of crosslinked, melt-shaped articles, the process comprising the steps of:

A. Forming a crosslinkable mixture comprising:
  1. Organopolysiloxane containing two or more functional end groups (such as hydroxyl end groups); and
  2. Silane-grafted or silane-copolymerized polyolefin;
B. Melt-shaping and partially crosslinking the mixture into an article; and
C. Cooling and continuing crosslinking the melt-shaped article.

The process does not require the use of post-shaping external heat and/or moisture although either or both can be used if desired. Crosslinking can be promoted by the addition of a catalyst to the mixture before or during melt-shaping, or to the melt-shaped article (e.g., by diffusion from an adjoining layer if the article is a layer in a multilayer construction. Surprisingly, compounding the crosslinkable mixture containing these components produces a stable thermoplastic composition which can be shaped and partially crosslinked by melt processing into an article, but upon storage at ambient conditions undergoes thorough crosslinking without the need for external moisture or heat. At a microscopic scale the morphology of such a blend shows greater compatibility between the silicone and the polyolefin phases compared to either a physical (unreacted) siloxane/polyolefin blend or a physical, i.e., unreacted, blend of a siloxane and a silane-grafted polyolefin.

The process of this disclosure eliminates the reliance on external moisture diffusion that is required in conventional moisture cure. The process of this disclosure is particularly useful for manufacturing thick-wall (greater than (>) 0.2, more typically >0.5 and even more typically >1, millimeter (mm)), crosslinked constructions such as in high and medium voltage cable insulation, wire and cable molded elastomeric connectors and accessories, and molded automotive heat resistant parts. In the case of injection molded parts, after injection in a mold and once the article is formed, the articles do not require additional heating or holding times to cure. Rather, the article can be cooled to achieve green strength to retain the desired shape upon removal from the mold. Once removed from the mold, the cure step continues off mold to achieve full cure. This approach improves manufacturing cycle time and achieves higher productivity (units per time).

In one embodiment hydroxyl-terminated organopolysiloxane is reacted with an alkoxysilane (or silanol) that is grafted to a polyolefin or other polymer. Methods for preparation of such grafted polymers are well known. For example, vinyltrimethoxysilane (VTMS) can be grafted to polyethylene using peroxide. Also, various reactor copolymers are available, such as SI-LINK™, which is a copolymer of VTMS and ethylene available from The Dow Chemical Company.

In one embodiment the disclosure is a process for the manufacture of crosslinked, melt-shaped articles, the process comprising the steps of:

A. Forming a crosslinkable mixture comprising:
  1. Organopolysiloxane containing two or more functional end groups (such as hydroxyl end groups);
  2. Polyolefin;
  3. Alkoxysilane; and
  4. Peroxide;
B. Melt-shaping the mixture into an article at conditions sufficient to graft the alkoxysilane to the polyolefin and to partially crosslink the silane-grafted polyolefin; and
C. Cooling and continuing the crosslinking of the article.

This embodiment combines the silane grafting of the polyolefin and the initiation of the crosslinking of the mixture into a single step.

In one embodiment the disclosure is a process for the manufacture of crosslinked, melt-shaped articles, the process comprising the steps of:

1. Preparing a silane-grafted polyolefin;
2. Mixing the silane-grafted polyolefin with a hydroxyl-terminated polydimethylsiloxane;
3. Melt-shaping the mixture into a storage article;
4. Introducing the storage article to a second melt-shaping operation in which the storage article is melt-shaped into a finished article;
5. Introducing a crosslinking catalyst during or after the second melt-shaping operation; and
6. Cooling and crosslinking the finished article from the second melt-shaping operation.

This embodiment allows for the decoupling of the mixture-forming steps from the melt-shaping and crosslinking steps thus allowing the process to be performed over different spaces and times. The storage article is typically pellets which are re-melted and optionally mixed with a crosslinking catalyst to form the finished molded or extruded article.

Polysiloxane Linkage

Without being bound by theory, it is believed that the crosslinkable mixture forms unique polysiloxane linkages between polymer chains of the polyolefin when the crosslinkable mixture is subjected to a melt-shape, or melt-shaping, procedure. It is believed that during melt shaping, the hydroxyl-terminated organopolysiloxane reacts with the alkoxysilane (or silanol) that is grafted to the polyolefin to form a polysiloxane linkage between at least two individual polymer chains of the polyolefin. The polysiloxane linkage has the structure (I) below.

The value n is from 1 to 100,000. The term "n" can have a lower limit of 1, or 2, or, 3, or 4, or 5, or, 10, or 15, or 20 and an upper limit of 50, or 75, or, 100, or, 120, or 400, or 1000, or 100,000.

The polysiloxane linkage (I) is unique compared to linkages formed by way of conventional peroxide crosslinking and/or conventional silane graft/moisture cure. Conventional silane crosslinked polyolefin contains a "—Si—O—Si—" linkage between polymer chains. Conversely, the present polysiloxane linkage of structure (I) has a minimum of three (3) silicon atoms between polymer chains Applicant has discovered that the unique polysiloxane linkage (I) surprisingly results in a composition showing greater compatibility between polyolefin and silicone than would be obtained in a physical blend of silicone and polyolefin as demonstrated in FIGS. 4 and 5. Bounded by no particular theory, the hydroxyl-terminated organopolysiloxane reacted with the silane-grafted polyethylene in the presence of a catalyst surprisingly improves compatibility of the organopolysiloxane (i.e., PDMS) component within the polyolefin resulting in unique phase morphology.

Figure 4A:
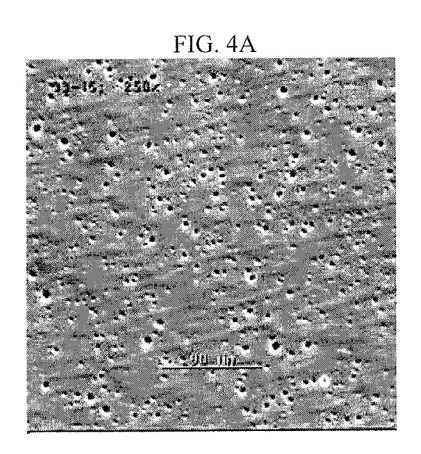
FIGS. 4A and 4B show electron micrographs of VTMS-grafted polyethylene mixed with hydroxy-terminated polydimethylsiloxane without catalyst and therefore uncrosslinked. The micrographs are at 250× and 500× magnifications respectively.
Figure 4B:
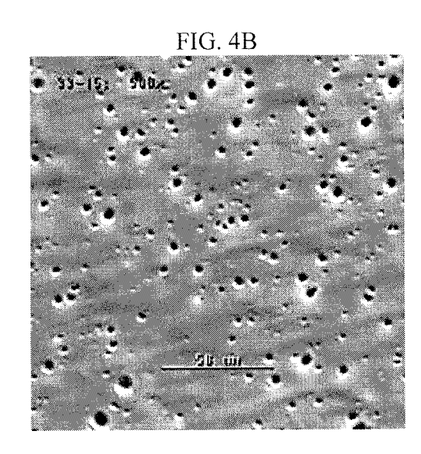

FIG. 4A (250×) and 4B (500×) are electron micrographs of polyethylene mixtures made of VTMS silane-grafted polyethylene mixed with hydroxy-terminated polydimethylsiloxane (PDMS). The immiscible silicone is visible as discrete and distinct domains within the polyethylene matrix. Bounded by no particular theory, it is believed the immiscible silicone is unreacted (i.e., non-crosslinked) silicone.

Figure 5A:
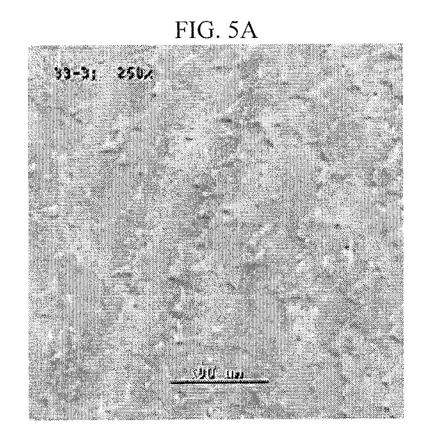
FIGS. 5A and 5B show electron micrographs of VTMS-grafted polyethylene mixed with hydroxy-terminated polydimethylsiloxane in the presence of a catalyst and crosslinked in accordance with an embodiment of the present disclosure. The micrographs are at 250× and 500× magnifications respectively.
Figure 5B:
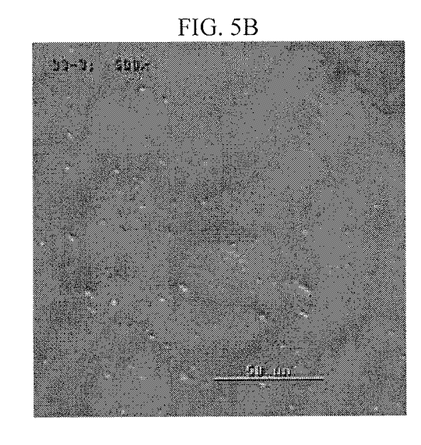

FIG. 5A (250×) and 5B (500×) show crosslinked polyethylene made by way of the present process which utilizes hydroxyl-terminated organopolysiloxane and avoids moisture cure. FIGS. 5A and 5B show electron micrographs of VTMS silane-grafted polyethylene mixed with hydroxy-terminated polydimethylsiloxane in the presence of a catalyst and crosslinked in accordance with an embodiment of the present disclosure. Present in the crosslinked polyethylene of FIGS. 5A and 5B are polysiloxane linkages of structure (I) linking individual polyethylene chains. The micrographs of FIGS. 5A and 5B show a uniform morphology—evidence of the improved compatibility between the hydroxyl-terminated organopolysiloxane and the polyethylene due to the incorporation of the silicone into the linkage of structure (I). Formation of the polysiloxane linkage (I) does not require moisture (i.e., water) as required by conventional moisture cure.

Articles of Manufacture

In one embodiment, the composition of this disclosure can be applied to a cable as a sheath or insulation layer in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder.

One of the benefits of this disclosure is that the melt-shaped article does not require post-treatment, e.g., after de-molding or passing through a shaping die, cure conditions, e.g., temperature above ambient and/or moisture from an external source such as a water bath or "sauna". While not necessary or preferred, the melt-shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should preferably be above 0° C.

Other articles of manufacture that can be prepared from the polymer compositions of this disclosure include fibers, ribbons, sheets, tapes, tubes, pipes, weather-stripping, seals, gaskets, hoses, foams, footwear and bellows. These articles can be manufactured using known equipment and techniques.

The melt-shaped article may comprise two or more embodiments disclosed herein.

By way of example, and not by limitation, examples of the present disclosure will now be provided. Unless otherwise noted, all parts and percentages are by weight.

EXAMPLES

Example 1

Table 1 reports the evaluation of several compositions. ENGAGE™ 8200 plastomer (an ethylene-octene copolymer of SMI, 0.870 density, solid pellets) is used in the experiments. The polymer pellets are heated at 40° C. for two hours then tumble blended with a mixture of VTMS and LUPEROX 101 peroxide (2,5-dimethyl-2,5-di(t-butylperoxy)hexane available from Arkema) and left to soak in a glass jar using a jar roller until the pellets are visibly dry.

A Brabender batch mixer (250 gram) is used for grafting VTMS to the polymer. Compounding is conducted at 190° C. for 15 minutes. The grafted polymer is pressed into a plaque at room temperature and sealed in a foil bag for subsequent experiments with polydimethylsiloxane (PDMS).

A Brabender mixer (45 cc) is used to compound the grafted resin, silanol-terminated PDMS and catalyst. Compounding was performed at a set temperature of 150° C. as follows. First, the mixer was loaded with VTMS-grafted ENGAGE 8200, fluxed and mixed for 2 minutes at 45 revolutions per minute (rpm). Silanol-terminated PDMS (Gelest DMS-S15) is added gradually over a period of approximately 3 minutes and after addition is completed, the blend is further mixed for 2 minutes at 45 rpm. Catalysts (DBTDL, sulfonic acid or mixture) are then added and mixed for 15 minutes at 45 rpm. If the resulting compound is thermoplastic, i.e. no significant crosslinking is visible, it is pressed into a 50 mil (~1.3 mm) plaque immediately after removal from the mixer and stored overnight in a sealed aluminum foil bag at 25° C.

Samples are then cut to analyze for cure via hot creep analysis (200° C. oven, 15 min) in which percent elongation under 20 N/cm² load is measured. A common standard for adequate crosslinking is elongation of less than or equal to (≤) 100%. Measurements are obtained on triplicate samples.

TABLE 1

Hot Creep Test Results of Test Compositions

| Component | A | B | C | D | E | F |
|---|---|---|---|---|---|---|
| Si-g-PE | 0 | 99.85 | 95 | 94.85 | 94.85 | 99.85 |
| Sil-PDMS | 5 | 0 | 5 | 5 | 5 | 0 |
| Sulfonic Acid. | 0 | 0 | 0 | 0 | 0.15 | 0.15 |
| DBTDL | 0 | 0.15 | 0 | 0.15 | 0 | 0 |
| ENGAGE 8200 | 95 | 0 | 0 | 0 | 0 | 0 |

TABLE 1-continued

Hot Creep Test Results of Test Compositions

| Component | A | B | C | D | E | F |
|---|---|---|---|---|---|---|
| Total | 100 | 100 | 100 | 100 | 100 | 100 |
| Total Mixing Time (min) | 22 | 15 | 15 | 21 | 21 | 15 |
| Hot Creep (100% Elongation) | Melted | Fail | Fail | *Crosslinked prematurely | Pass | Fail |

*Since the sample crosslinked prematurely, the catalyst level was subsequently reduced as described in later examples.
Si-g-PE is silane grafted ENGAGE 8200 plastomer.
Sil-PDMS is Gelest DMS-S15 silanol-terminated PDMS.
Sulfonic acid is B-201 available from King Industries.
DBTDL is FASTCAT 4202 dibutyl tin dilaurate.
Hot Creep Test Percent Elongation measured at 200° C., 0.2 MPa load held for 15 minutes by IEC 60811-2-1.

As shown by the hot creep test results in Table 1, the addition of PDMS to either the base resin (sample A, a control) or a silane grafted resin (sample C) does not produce the desired cross-linking. Further comparative examples, (samples B and F), which represent conventional moisture cure systems, failed the hot creep test after overnight storage with no external moisture exposure (except what may have been trapped during compounding or in the storage bag). Inventive samples D and E in which OH-terminated PDMS is added to a grafted resin and further reacted with a catalyst produce effective crosslinking, either immediately during the compounding step in the mixer (sample D) or produced a thermoplastic compound, that could be shaped into a formed article (e.g. a plaque) and when stored overnight in sealed bag produced a homogenous crosslinking as shown by sample E. This is the desired result.

The data also show that it is possible to design compositions that can be homogenously mixed to produce a thermoplastic material that exhibit excellent crosslinking without the need for external moisture exposure which is desirable for thick articles such as molded parts or medium voltage and high voltage cable coating.

Figure 1:
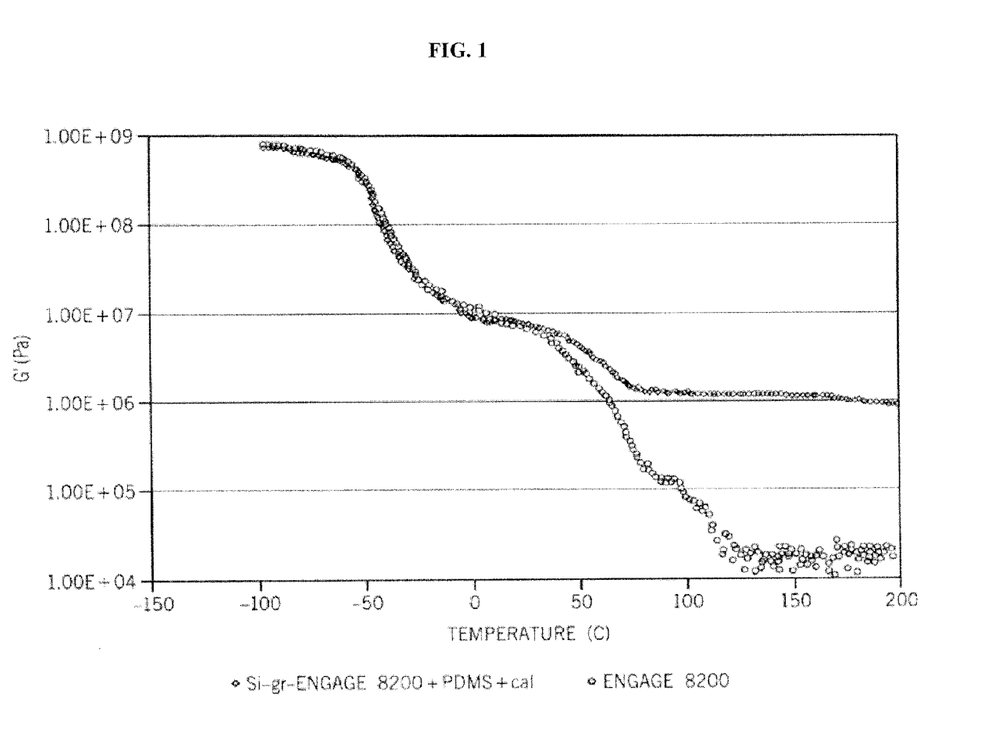
FIG. 1 is a graph reporting the data from a dynamic mechanical analysis (DMA) of an ENGAGE plastomer and an ENGAGE plastomer reactively modified with hydroxyl-terminated polydimethylsiloxane (PDMS).

As a further confirmation of crosslinking, the composition of sample E is repeated in another experiment, the sample made is subjected to a DMA analysis, with a temperature sweep from −150° C. to 200° C. As the data in the Figure shows, compared to the ENGAGE 8200 base resin (melting point ~70° C.), the modulus of the reactively-modified PDMS-ENGAGE blend exhibits a plateau past the melting point, indicating a good temperature resistance compared to the base resin.

Electron microscopy shows drastically improved phase compatibility. For example, sample E shows a predominantly single homogeneous phase with only a small amount of dispersed silicone domains. In contrast, other compositions tested (samples A and C) resulted in morphologies typical of highly immiscible systems containing distinct dispersed domains of silicone visible as droplets within the polyolefin matrix.

Example 2

The data reported in Table 2 compare an LLDPE resin (0.7 MI, 0.920 g/cm³ density) grafted with 2% VTMS in the presence of 3% silanol-terminated polydimethylsiloxane (OH-PDMS) versus a control sample grafted under the same conditions without the OH-PDMS. Both materials are first dried and then extruded on a wire (124 mil wire O.D., 30 mil wall thickness) in the presence of a tin catalyst. The insulation is removed, cured for 16 hours under ambient conditions (23° C. and 70% relative humidity), and then subjected to a hot creep test at 200° C., 15 min, 15 N/m²). The results show that the comparative composition does not achieve 100% hot creep elongation and 10% hot set targets. In contrast, the inventive composition does pass the hot creep and hot set tests. The data demonstrate the rapid cure rate at ambient conditions achieved with the disclosure.

TABLE 2

Hot Creep and Hot Set Test Results of Test Compositions

|  | Inventive Composition | Comparative Composition |
|---|---|---|
| Hot Creep (% elongation) | Pass | Fail |
| Hot Set (% elongation) | Pass | Fail |

Example 3

Figure 2:
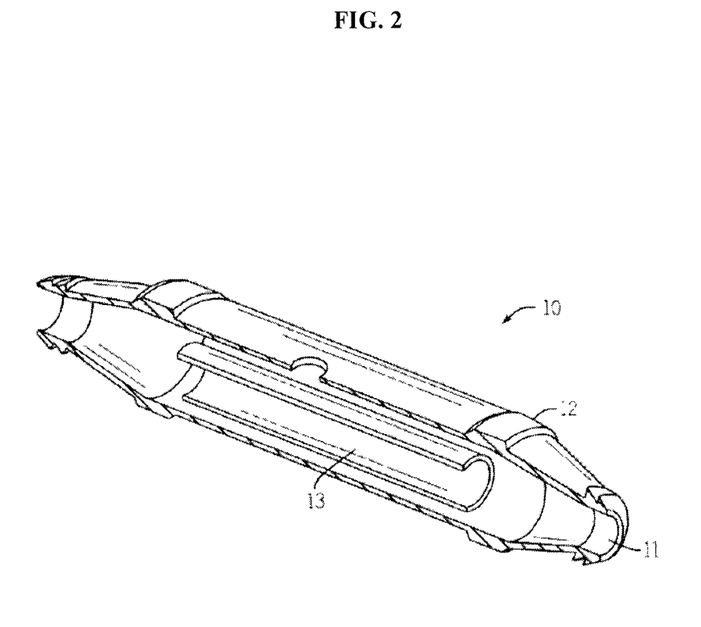
FIG. 2 is a schematic of a cross-section of a molded electrical connector comprising a thick-wall insulation layer sandwiched between two semiconductive layers.
Figure 3:
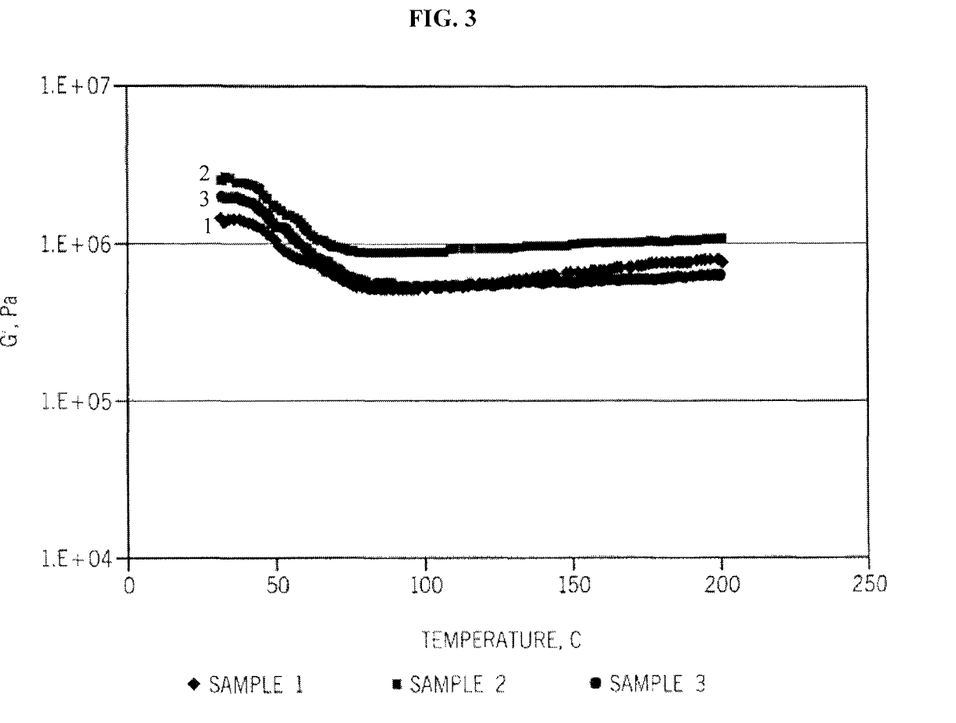
FIG. 3 is a graph reporting the DMA of the cross-linked insulation layer of FIG. 2.

The data set for this example is obtained on a sample taken from a molded part. Molded part 10 (FIG. 2) comprises insulation layer 11 made out of an elastomer resin system which is grafted with vinyltrimethoxysilane in the presence of OH-PDMS. Molded part 10 is a 35 KV prototype connector comprising outer (12) and an inner (13) semicon layers sandwiching insulation layer 11. Insulation layer 11 comprises a composition of this disclosure. The semicon layers are first molded separately and peroxide-cured in a first molding step, then mounted together in a second mold where the insulation layer is injected between them. The insulation compound (pellets) is premixed with a tin catalyst masterbatch (also pellets), injection is conducted in a fully thermoplastic fashion, and the part is de-molded upon cooling (1-5 minutes molding time depending on the test run). Inner semicon layer 13 is about 4 mm thick and covers most of the insulation, except towards the ends. Outer semicon layer 12 is about 3.5 mm thick and covers the entire insulation layer, i.e. no external exposure. Insulation layer 11 is about 11.6 mm thick and becomes a molded article post-injection. Once received from the molding shop, the part is cut and three samples are taken from the middle section of the insulation layer for DMA testing. All samples are 1.9 mm thick. Starting from the outside edge of the insulation layer, Sample 1 is about 3 mm inside the layer, Sample 2 is about 5 mm inside the layer, and Sample 3 is about 7 mm inside the layer. The part is handled under normal shipping and lab storage conditions prior to testing, i.e. no special heat or moisture exposure and was tested for cross-linking days after molding. The DMA data in FIG. 3 shows a plateau modulus at a temperature above the melting point for each of the samples or in other words, complete cure of the material.

Example 4

Sample Preparation

Insulation materials, sample 2, sample 5 and sample 6, are prepared via reactive extrusion in a ZSK-30 twin-screw extruder.
- sample 2 contains no flexibility modifier
- sample 5 is modified with paraffinic oil (Sunpar 2280, Sunoco Corp.)
- sample 6 is modified with Liquid Polymer Modifier (Elevast R150, ExxonMobil Corp.)

Samples 2, 5, and 6 are melt-mixed with a tin catalyst masterbatch at 5% level in 250 cc Brabender at 150° C., 35 RPM, 10 min.

Plaques are prepared via compression molding at 170° C. for 5 min, cooled in press and removed from mold.

The plaques are cured in a controlled environmental chamber for 3 days at ambient conditions (23° C. and 70% RH.)

The cured plaques are tested for mechanical and electrical properties as shown in Table 3.

TABLE 3

| Insulation Compounds (ZSK-30) | Sample 2 | Sample 5 | Sample 6 |
|---|---|---|---|
| Engage 8200 | 45.49 | 40.49 | 40.49 |
| Engage 7467 | 45.49 | 40.49 | 40.49 |
| PDMS Q-3563 | 5.00 | 5.00 | 5.00 |
| VTMS | 2.00 | 2.00 | 2.00 |
| L-101 | 0.03 | 0.03 | 0.03 |
| Translink 37 | 2.00 | 2.00 | 2.00 |
| Sunpar oil |  | 10.00 |  |
| Elevast R-150 |  |  | 10.00 |
| Total | 100.00 | 100.00 | 100.00 |
| Peakstress (psi) | 1114 | 1215 | 983 |
| StrnAtBreak (%) | 653 | 753 | 715 |
| M-100 | 290 | 229 | 228 |
| Shore A | 68.1 | 62.4 | 61.4 |
| Hot Creep % | 50.2 | 70.5 | 68.8 |
| Hot Set % | 1.7 | 4.1 | 2.4 |
| Avg. ACBD | 40.9 | 30.9 | 38.5 |
| STD on ACBD | 1.7 | 2.3 | 3.8 |

Alternating current breakdown (ACBD) strength is the minimum alternating current voltage that causes a portion of a material (such as an insulator) to become electrically conductive. ACBD is determined in accordance with ASTM D 149 (kV/mm).

Nonlimiting embodiments of the present disclosure are provided below. E1. A crosslinkable mixture is provided and includes a polyolefin, an alkoxysilane, an organopolysiloxane containing two or more hydroxyl end groups, a free radical initiator, and a liquid polymer modifier. E2. The crosslinkable mixture of E1 wherein the crosslinkable mixture forms polysiloxane linkages between the polymer chains of the polyolefin when the crosslinkable mixture is melt-shaped into an article, the polysiloxane linkages having the structure (I)

(I)

wherein n=1 to 100,000.

E3. The crosslinkable mixture of E2 wherein additional polysiloxane linkages of the structure (I) form when the melt-shaped article is exposed to ambient temperature. E4. The crosslinkable mixture of any of E1-E3 comprising a crosslinking catalyst. E5. The crosslinkable mixture of any of claims E1-E4 wherein the polyolefin is a polyethylene. E6. The crosslinkable mixture of any of E1-E5 comprising a first polyethylene crosslinked to a second polyethylene by way of the polysiloxane linkage (I). E7. The crosslinkable mixture of any of E1-E6 wherein the alkoxysilane is vinyltrimethoxysilane. E8. The crosslinkable mixture of any of E1-E7 wherein the organopolysiloxane is hydroxyl-terminated polydimethylsiloxane. E9. The crosslinkable mixture of any of E1-E8 wherein the liquid polymer modifier is a non-functionalized plasticizer comprising a phthalate-free hydrogenated $C_8$-$C_{12}$ poly-alpha-olefin.

Another crosslinkable mixture (E10) is provided and includes a silane-grafted polyethylene, an organopolysiloxane containing two or more hydroxyl end groups, and a liquid polymer modifier. E11. The crosslinkable mixture of E10 wherein the crosslinkable mixture forms a crosslinked polymeric composition comprising polysiloxane linkages between the polymer chains of the polyolefin when the crosslinkable mixture is melt-shaped into an article, the polysiloxane linkages having the structure (I)

wherein n=1 to 100,000.

E12. A melt-shaped article is provided and includes a crosslinked polyethylene composition comprising polysiloxane linkages between the polymer chains of the polyethylene, the polysiloxane linkages having the structure (I)

wherein n=1 to 100,000; and a liquid polymer modifier. E13. The melt-shaped article of E12 comprising a first polyethylene is crosslinked to a second polyethylene by way of the polysiloxane linkage of structure (I). E14. The melt shaped article of any of E12-13 wherein the melt shaped article is selected from the group consisting of an insulation layer, a cable coating, and an electric power cable.

E15. An insulation layer of an electric cable is provided and comprises a crosslinked polyethylene composition comprising polysiloxane linkages between the polyethylene chains, the silane linkages having the structure (I)

wherein n=1 to 100,000, a liquid polymer modifier, and the insulation layer has an ACBD value greater than 34 kV/mm as measured in accordance with ASTM D 149. E16. The insulation layer of E15 wherein the ACBD value is greater than 34 kV/mm to 42 kV/mm.

E17. A melt-shaped article is provided and comprises a crosslinked polyethylene composition, an organopolysiloxane containing two or more hydroxyl end groups, and a liquid polymer modifier. E18. The melt-shaped article of E17 wherein the organopolysiloxane containing two or more hydroxyl end groups is hydroxyl-terminated polydimethylsiloxane. E19. The melt-shaped article of any of E17-E18 comprising a crosslinking catalyst. E20. The melt-shaped article of any of E17-E19 comprising polysiloxane linkages between the polyethylene chains, the polysiloxane linkages having the structure (I)

wherein n=1 to 100,000. E21. The melt-shaped article of any of E17-E20 wherein the melt shaped article is selected from the group consisting of an insulation layer, a cable coating, and an electric power cable.

Although the disclosure has been described with certain detail through the preceding specific embodiments, this detail is for the primary purpose of illustration. Many variations and modifications can be made by one skilled in the art without departing from the spirit and scope of the disclosure as described in the following claims.

What is claimed is:

1. A melt-shaped article comprising:
   a first molded layer;
   a second molded layer;
   an insulation layer comprising a crosslinked polyethylene composition injected between the first molded layer and the second molded layer;
   the crosslinked polyethylene composition comprising (i) a catalyst, (ii) an organopolysiloxane and (iii) a liquid polymer modifier that is a phthalate-free non-functionalized hydrogenated $C_8$ to $C_{12}$ poly-alpha-olefin;
   wherein the liquid polymer modifier is present to the exclusion of mineral oil and paraffin oil, the crosslinked polyethylene composition comprises (a) a silane-grafted polyethylene and (b) polysiloxane linkages between the polymer chains of the silane-grafted polyethylene, the polysiloxane linkages having the structure (I)

wherein n=1 to 100,000, and
   the insulation layer has an alternating current breakdown strength (ACBD) greater than 34 kV/mm as determined in accordance with ASTM D 149.

2. The melt-shaped article of claim 1 wherein the insulation layer has a thickness greater than 0.2 mm.

3. The melt-shaped article of claim 1 wherein the insulation layer has a thickness greater than 0.5 mm.

4. The melt-shaped article of claim 1 wherein the insulation layer has a thickness greater than 1.0 mm.

5. The melt-shaped article of claim 1 comprising a first silane-grafted polyethylene crosslinked to a second silane-grafted polyethylene by way of a polysiloxane linkage.

6. The melt-shaped article of claim 1 wherein the melt shaped article is selected from the group consisting of a cable coating, and an electric power cable.

7. The melt-shaped article of claim 1 wherein the article is selected from the group consisting of cable insulation, wire molded elastomeric connectors, cable molded elastomeric connectors, and molded automotive heat resistant parts.

8. The melt-shaped article of claim 1 wherein the crosslinked polyethylene composition has a Shore A hardness of 61.4.

9. The melt-shaped article of claim 1 wherein the crosslinked polyethylene composition is formed from a process comprising injecting an un-crosslinked polyethylene composition between the first molded layer and the second molded layer.

10. The melt-shaped article of claim 1 wherein the crosslinked polyethylene composition forms a molded insulation layer shaped by the first molded layer and the second molded layer.

11. The melt-shaped article of claim 1 wherein the first layer is a semiconductive layer.

12. The melt-shaped article of claim 11 wherein the second layer is a semiconductive layer.

13. The melt-shaped article of claim 1 comprising a cable extending through the melt-shaped article.

* * * * *